Sept. 3, 1963  E. AHO  3,102,760
CAGE FOR STRAIGHT ROLLER BEARING
Filed March 23, 1961
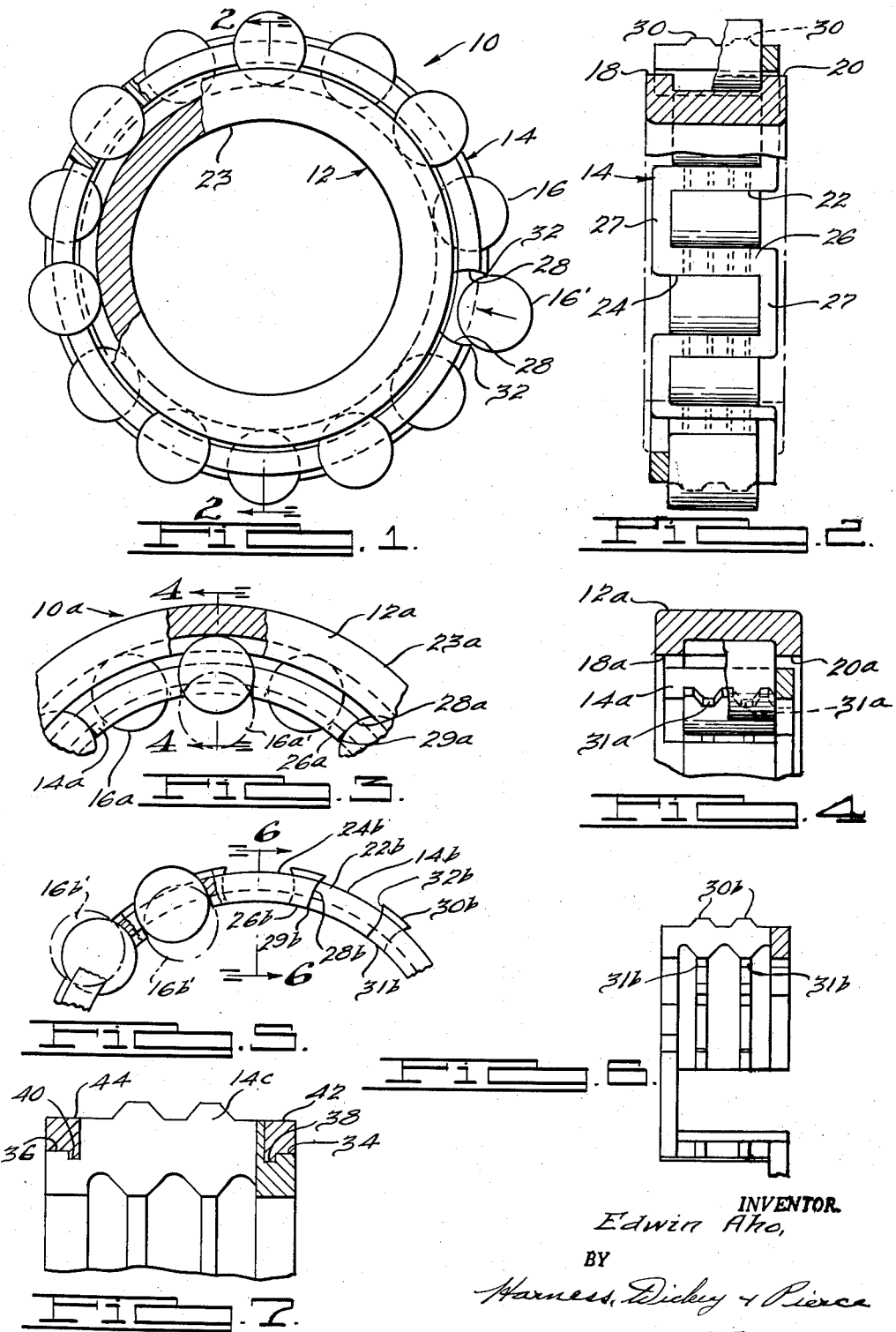
INVENTOR.
Edwin Aho,
BY
Harness, Dickey & Pierce
ATTORNEYS.

United States Patent Office 3,102,760
Patented Sept. 3, 1963

3,102,760
CAGE FOR STRAIGHT ROLLER BEARING
Edwin Aho, Center Line, Mich., assignor to Federal-Mogul-Bower Bearings, Incorporated, Detroit, Mich., a corporation of Michigan
Filed Mar. 23, 1961, Ser. No. 97,823
7 Claims. (Cl. 308—217)

This invention relates to bearings and more specifically to a novel construction of a roller bearing assembly.

A bearing assembly essentially comprises a plurality of rollers held in a bearing cage and disposed between a pair of relatively rotatable members. One of these members is usually a bearing race. In general the function of the bearing cage or roll separator is to maintain the rollers in the bearing assembly and to space the rollers equally so as to insure proper load distribution within the bearing and on the rollers; it is desirable that this be done in such a manner as to produce the least possible friction through sliding engagement of the cage with a bearing race or other member. The latter can be better understood from the following discussion. It can be appreciated that all of the rollers are not equally loaded at one time. It is known that when the rollers enter a loaded zone and gradually take on increasing load there is a tendency for the movement of the roll center of the rollers to slow up until the position of maximum load is reached. After this point, that sequence is reversed. Thus in the movement into the loaded zone there is a tendency to compress the separator between the rollers. It is common practice for the webs separating individual rollers to be formed of a wedge-shaped construction or to have a circular cross section. In such a case, the compressive force on that particular web between a pair of rollers has a component which tends to move the bearing cage either radially inwardly or radially outwardly, depending upon the inclination of the faces of the wedge-shaped section or depending upon the load distribution if the web is of a circular cross sectional area. In either case the result is generally a loading of the bearing cage or roll separator and a consequent radial deflection of the cage. In many instances the deflection is sufficient to bring the bearing cage or roll separator into sliding frictional contact with the bearing race. This, of course, results in a loss of power and efficiency and in wear upon the bearing cage. The solution to this problem is to construct the bearing seats or the webs separating the rollers such that the surface contacting the roller is circular and of essentially the same diameter as the roller and is oriented relative to the roll center of the roller such that the radially inner and radially outer components of force on each web are substantially equal. In this way there is no resultant component of the compressive force in the radial direction such as to cause deflection of the cage and only simple compressive loading of the individual webs of the bearing cage occurs.

It can be appreciated that in the construction of a one-piece bearing cage the formation of seats on the individual webs having the desired circular shape presents additional problems i.e. such a construction could be neither cut nor cast into a one-piece ring of conventional construction without excessive cost or difficulty. The bearing assembly of this invention has a cage of such a construction as to facilitate the formation of webs with circularly contoured surfaces. Other advantages of the improved bearing construction of this invention will be more readily ascertainable from the remainder of this disclosure. It is an object of this invention to provide a bearing assembly having a novel construction whereby sliding friction between the bearing cage and bearing race is eliminated.

It is another object of this invention to provide a bearing assembly whereby the bearing cage is radially unloaded.

It is an object of this invention to provide a bearing assembly having a construction such that the bearing seats are of a shape essentially similar to that of the periphery of the roller.

It is an object of this invention to provide a bearing cage of a one-piece construction for use in a bearing assembly whereby the cage remains essentially radially unloaded during the application of heavy bearing loads.

Other objects, features, and advantages of the present invention will become apparent from the subsequent description, and the appended claims taken in conjunction with the accompanying drawings, in which:

FIGURE 1 is a front elevational view with some elements partially broken away of one construction of a bearing assembly embodying some of the features of this invention;

FIGURE 2 is a view of the construction of FIGURE 1 taken substantially along the lines 2—2;

FIGURE 3 is a fragmentary front elevational view with one element partially broken away of a modified bearing assembly;

FIGURE 4 is a fragmentary view of the bearing assembly of FIGURE 3 taken substantially along the lines 4—4;

FIGURE 5 is a fragmentary front elevational view partially in section of a modified bearing cage;

FIGURE 6 is a fragmentary view of the bearing cage of FIGURE 5 taken substantially along the lines 6—6; and FIGURE 7 is a fragmentary side elevational view of another bearing cage construction.

In general the bearing cage of the bearing assembly of this invention is a single piece construction formed by casting or other means with a plurality of annularly disposed pockets with alternate ones of these pockets opening axially on opposite sides of the bearing cage. By providing that the pockets open axially on either side of the bearing cage, a single piece construction can be utilized and the cage is then of such a construction as to facilitate either the casting or the machining of the arcuately concave surface as previously described. The cage performs the dual function of both guiding and retaining the rollers about the bearing race. More specifically now and looking to FIGURE 1, a bearing assembly embodying some of the features of this invention, is exemplarily shown and indicated by the numeral 10 and compirses an inner race member 12, a roller cage or separator member 14 and a plurality of rollers 16. In that embodiment the inner race 12 is of a double lip construction as formed by a pair of axially-spaced radially outwardly extending circumferential flanges 18 and 20, and has a central bore 23 whereby the bearing assembly can be mounted upon a rotatable shaft or some other member, depending upon the use of the bearing.

As can be best seen in FIGURE 2, the bearing cage or roller separator 14 is of a single piece construction formed with a plurality of axially extending webs 26 circumferentially separating a plurality of annularly disposed pockets or slots 22 axially opening on one side of the cage 14 and a plurality of alternate annularly disposed pockets 24 axially opening to the opposite side of the bearing cage 14. The pockets 22 and 24 are formed by pairs of the webs 26 being connected at one axial extremity by some of a plurality of connecting portions 27 and with different pairs of webs 26 being connected at the opposite axial extremity by others of the connecting portions 27. Each of the webs or separating portions 26 of the bearing cage 14, are formed with arcuately concave bearing surfaces 28 (FIG. 1) having an external shape which is a portion of a circle having a radius substantially equal to the radius of each of the rollers 16.

In the construction as shown in FIGURE 1, each of the web portions 26 is formed with a pair of transverse ribs 30 on its radially outward side. Upon the machining or other type formation of the arcuate surfaces 28, the radially outward extremity of each of the ribs 30 are tapered to a feathered edge 32 for a purpose to be disclosed. The arcuate faces 28 are such that the distance between adjacent faces is substantially equal to the diameter of each of the plurality of rollers 16 at points substantially on the mean diameter of the bearing cage 14; sufficient clearance is provided as dictated by good design practice. This construction is provided so that the roll centers of the plurality of rollers 16 substantially fall on the mean diameter of the cage 14. The distance between adjacent arcuate surfaces 28 as measured between successive ribs 30 at the radially outermost side of the bearing cage 14 is less than the diameter of the rollers 16 by a predetermined amount for a purpose to be described; the radially innermost distance is less than that radially outermost distance and is substantially less than the diameter of the rollers 16 such as to radially retain the rollers.

In the embodiment as shown in FIGURE 1, the bearing can be assembled by two different methods; in one method alternate ones of the plurality of rollers 16 are distributed annularly about the periphery of the bearing race 12 in between the flanges 18 and 20; the bearing cage 14 is then positioned axially above the bearing race 12 with either pockets 22 or 24 in an opening position relative to those ones of the rollers peripherally spaced about the race 12; axial movement of the bearing cage or separator 14 towards the bearing race 12 causes the alternate ones of the rollers so spaced to engage and seat within the plurality of pockets, either 22 or 24. With one-half of the rollers thus assembled, the other half can then be forced into the others of the pockets by disposing the individual ones of the rollers radially outwardly with respect to that particular pocket (see 16′ in FIGURE 1); by applying a pressure radially inwardly, the feathered edges 32 of the flanges 30 are sufficiently deflectable such that the roller can be inserted into the pocket. With the roller in the pocket the edges 32 return by their resilience to their original position and thus serve to radially restrain the rollers. The remainder of the rollers can thus be inserted. Looking to FIGURE 1 it can be seen that the web portions are circumferentially thin relative to the diameter of the rollers 16; it is believed that with web portions 26 being thin the entire web portion 26 is more flexible and hence more readily displaced upon the insertion of the rollers past the feathered edges 22 into the pockets and thus facilitates this means of inserting the rollers.

An alternate method of assembling the bearing assembly as shown in FIGURE 1 is to dispose the bearing cage or separator 14 concentrically about the race 12 and then to insert all of the rollers 16 by pressing them radially inwardly into the pockets 22 and 24.

Note that a portion of each of the rollers 16 is disposed between the flanges 18 and 20 of the race 12. Once the bearing has been assembled, the race 14 cannot be removed or cannot fall free but is retained therein in assembly relationship by the interaction of rollers 16, race 12, and cage 14. For dissassembly, merely on-half of the alternate ones of the rollers need be removed by snapping radially outwardly past the feathered edges 32 of the ribs 30; then the bearing cage or separator 14 can be moved axially away from the other half of the rollers 16. It can be readily seen that with a bearing race having a single lip or having no lips or flanges at all, no need would present itself for snapping the rollers 16 into the pockets 22 and 24 since all of the rollers could then be assembled by the simple axial insertion of those rollers into the pockets 22 and 24.

The bearing construction of FIGURE 1 offers a distinct advantage over bearings in which the rollers are riveted or pinned to the cage in that in the riveted construction loss or damage of one of the rollers necessitate the replacement of the entire cage and, in many cases, the entire assembly. In the assembly shown in FIGURE 1 individual ones of the rollers can be removed or if the cage is found to be worn excessively or in need of replacement, that can be easily replaced while still preserving the use of the race and of the rollers 16. In other types of bearings in which all of the bearings can be snapped in, it can be seen that the construction as shown in FIGURE 1 presents the advantage in that disassembly is facilitated in that only one-half of the rollers need be snapped out of a double lip type race before the assembly can be completely disassembled.

In the assembly shown in FIGURE 1, the rollers 16 bear against the arcuate surfaces 28 in which case the load is substantially equally distributed over the entire bearing surface 28 and on opposite sides of the mean diameter of the bearing cage 14; thus the compressive forces between adjacent ones of the rollers 16 is distributed such as to produce no resultant radial force on the bearing cage 14 and to thus essentially maintain an unloaded bearing cage. It can be appreciated that in this type of a cage, no frictional contact will occur between the cage 14 and the flanges 18 and 20 of the bearing race 12.

For a bearing assembly utilizing an outer race, a slightly different construction is utilized as shown is utilized in FIGURES 3 and 4. In discussing the race components of the assembly in FIGURES 3 and 4 components similar to those of FIGURES 1 and 2 are given like numbers with the added suffix "a."

Looking now to FIGURE 3, a bearing assembly generally indicated by the numeral 10a comprises an outer race member 12a, a roller cage or separator member 14a, and a plurality of rollers 16a. In that embodiment, the outer race 12a is of a double lip construction as formed by a pair of axially spaced radially inwardly extending circumferential flanges 18a and 20a, and has an external diameter 23a whereby the bearing assembly can be mounted within a member having a suitable mating bore.

The bearing cage or separator 14a is of a construction similar to the bearing cage 14 as shown in FIGURES 1 and 2 and is of a single piece construction formed with a plurality of annularly disposed pockets or slots axially opening on one side of the cage 14a and a plurality of alternate annularly disposed pockets axially opening on the opposite side of the bearing cage 14a. In the construction of FIGURES 3 and 4 each of the webs or separating portions 26a of the bearing cage 14a is formed with a pair of ribs 31a on the radially inward side. The ribs 31a are similar to the ribs 30 in FIGURES 1 and 2 which were shown formed on the radially outer side of cage 14. The webs 26a are formed with arcuate bearing surfaces 28a (FIGURE 3) having an external shape which is a portion of a circle having a radius substantially equal to the radius of each of the rollers 16a.

The arcuate faces 28a are such that the linear distance at points substantially on the mean diameter of the bearing cage 14a between adjacent faces is substantially equal to the diameter of each of the plurality of rollers 16a. The linear distance between adjacent arcuate surfaces 28a as measured at the radially innermost side between adjacent ribs 31a and the distance at the radially outermost side of the bearing cage 14a is less than the diameter of the rollers 16a. In order to facilitate insertion of the rollers in a method to be described, the surfaces 28a of each rib 31a is partially machined or otherwise broken away at its radially innermost portion 29a. The amount of material removed at the portion 29a and the depth of removal is determined by a desired preselected interference fit between the plurality of rollers 16a and the pockets defined by the ribs 26a.

In the embodiment as shown in FIGURE 3, the bearing can be assembled by first distributing alternate ones of the plurality of rollers 16a annularly about the periphery of the bearing race 12a in between the flanges 18a and 20a; the bearing cage 14a is then positioned axially about the bearing race 12a with either of the plurality of pockets in an opening position relative to those ones of the rollers 16a so disposed; axial movement of the bearing cage or separator 14a towards the bearing race 12a causes the alternate ones of the rollers 16a so spaced to engage and seat within the plurality of pockets. With one-half of the rollers thus assembled, the other half can then be forced into the others of the pockets by disposing the individual ones of the rollers radially inwardly with respect to their particular pockets (see rollers 16a' in FIGURE 3); by applying a pressure radially outwardly the roller 16a' can be forced past the surfaces 29a and snapped into the pocket. The remainder of the rollers can be similarly inserted.

Again a portion of each of the rollers 16a is disposed between the flanges 18a and 20a in the race 12a. Thus once the bearing has been assembled, the cage 14a cannot fall free but is retained therein in assembled relationship by the interaction of rollers 16a, race 12a and cage 14a. Note that the bearing cage as shown in FIGURES 1 and 2 is usable with a double lip inner race while the bearing cage shown in FIGURES 3 and 4 is usable with a double lip outer race. A universal type bearing cage, usable for either inner or outer double lip races, is shown in FIGURES 5 and 6, where like components have like numbers with the suffix "b" added.

Looking now to FIGURE 5, a bearing cage or separator 14b is formed with a plurality of pockets 22b and 24b opening on axially opposite sides of the bearing race or separator 14b and separated by a plurality of webs 26b. The bearing race 14b is similar to bearing race 14 of FIGURES 1 and 2 in that a pair of ribs 30b are disposed on each web 26b on its radially outermost surface. These ribs 30b terminate in feathered edges 32b which serve the same function as the feathered edges 32 did in the embodiment of FIGURES 1 and 2. Radially inner ribs 31b which are formed on the radially innermost side of each web 26b are similar to the ribs 31a described in conjunction with the embodiment shown in FIGURES 3 and 4. The plurality of webs or separating portions 26b are formed with the arcuate bearing surfaces 28b which are broken at the radially inner most portion 29b of each of the radially inward ribs 31b. In the embodiment shown in FIGURE 5, the rollers 16b' are shown to be insertable by snapping either radially inwardly or radially outwardly into the pockets 22b and 24b. Thus the bearing race or separator 14b shown in FIGURES 5 and 6 is universal in that it can be used in conjunction with either a double lip inner race or a double lip outer race.

For some uses in which the bearing assembly is to be subjected to extremely high speeds, it is desirable that the bearing cage be made more rigid radially. This can be done by closing both sets of pockets. In the construction shown in FIGURE 7, a pair of circumferentially extending notches 34 and 36 are disposed at the axial extremities of a bearing cage 14c. The notches 34 and 36 terminate in small locking grooves 38 and 40, respectively. A pair of annular rings 42 and 44 are matably disposable within the notches 34 and 36 and have portions matable within the locking grooves 38 and 40. Any tendency for the race 14c to expand under high speeds is counteracted by the action of the rings 42 and 44.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a bearing assembly including a plurality of rollers, a one-piece bearing cage comprising a plurality of annularly disposed, axially extending webs circumferentially separating a plurality of pockets alternately opening on opposite axial sides for holding the plurality of rollers and with each of said webs being thin circumferentially relative to the diametrical dimension of the rollers, said pockets having confronting bearing surfaces having substantially equal contact areas on opposite sides of the mean diameter of said cage whereby the magnitude of the resultant radial force exerted by the rollers on said web is minimized, radially disposed rib portions extending transversely on said web such that the distance between successive ones of said rib portions at their radial extremities provides a preselected interference relative to the diametrical dimension of the rollers, said ribs being disposed on the radially outermost side of said webs and with each of said ribs tapering to a feathered edge at its radial extremity, said feathered edge being sufficiently deflectable such that each of the plurality of rollers is movable radially inwardly past said feathered edges into said pockets and being sufficiently resilient to return to a position such as to radially retain the rollers.

2. In a bearing assembly including a plurality of rollers, a one-piece bearing cage comprising a plurality of annularly disposed axially extending webs circumferentially separating a plurality of pockets alternately opening on opposite axial sides for holding the plurality of rollers, radially disposed rib portions extending transversely on the radially outermost side of said webs and tapering to a feathered edge such that the distance between different ones of said feathered edges on successive ones of said rib portions provides a preselected interference relative to the diametrical dimension of the rollers, said feathered edges being sufficiently deflectable such that each of the plurality of rollers is movable radially inwardly past said feathered edges into said pockets and being sufficiently resilient to return to a position such as to radially retain the rollers, each of said webs and said rib portions associated therewith having an arcuately concave bearing surface individual to one of said plurality of said pockets with alternate ones of said bearing surfaces disposed in face to face relationship on opposite circumferential sides of each of said pockets, said arcuately concave bearing surface being formed as a portion of a circle having a radius substantially equal to the radius of each of the plurality of rollers and having substantially equal contact areas on opposite sides of the mean diameter of said cage whereby the resultant radial force exerted by the rollers on said webs is minimized.

3. In a bearing assembly including a plurality of rollers, a one-piece bearing cage comprising a plurality of annularly disposed axially extending webs circumferentially separating a plurality of pockets alternately opening on opposite axial sides for holding a plurality of rollers, radially disposed rib members extending transversely on the radially innermost side of said webs, each of said webs and said rib members associated therewith having an arcuately concave bearing surface individual to one of said plurality of pockets with alternate ones of said bearing surfaces disposed in face to face relationship on opposite circumferential sides of said pockets, said arcuately concave bearing surface being formed as a portion of a circle having a radius substantially equal to the radius of each of the plurality of rollers and being matable with the rollers with the roll center of the rollers located substantially on the mean diameter of said cage, each of said rib members being broken away on said concave bearing surface such that the distance at the radially inner extremity between different ones of said rib members on successive ones of said webs provides a preselected interference relative to the diametrical dimension of the rollers such that each of the plurality of rollers can be moved radially outwardly past said rib members into said pockets.

4. In a bearing assembly including a plurality of rollers, a one-piece bearing cage comprising a plurality of annularly disposed axially extending webs circumferentially separating a plurality of pockets alternately opening on opposite axial sides for holding a plurality of rollers, radially disposed rib portions extending transversely on the radially outermost side of said webs and tapering to a feathered edge such that the distance between different ones of said feathered edges on successive ones of said rib portions provides a preselected interference relative to the diametrical dimension of the rollers, said feathered edges being sufficiently deflectable such that each of the plurality of rollers is movable radially inwardly past said feathered edges into said pockets and being sufficiently resilient to return to a position such as to radially retain the rollers, radially disposed rib members extending transversely on the radially innermost side of said webs, each of said webs, with those of said rib portions and said rib members associated therewith, having an arcuately concave bearing surface individual to one of said plurality of pockets with alternate ones of said bearing surfaces disposed in face to face relationship on opposite circumferential sides of said pockets, said arcuately concave bearing surface being formed as a portion of a circle having a radius substantially equal to the radius of each of the plurality of rollers and having substantially equal contact areas on opposite sides of the mean diameter of said cage whereby the magnitude of the resultant radial force exerted by the rollers on said webs is minimized, each of said rib members being broken away on said concave bearing surface such that the distance at the radially inner extremity between different ones of said rib members on successive ones of said webs provides a preselected interference relative to the diametrical dimension of the rollers such that each of the plurality of rollers can be moved radially outwardly past said rib members into said pockets.

5. A bearing assembly comprising a plurality of rollers, an inner race member having a pair of radially outwardly extending annular flanges axially disposed on either side of said race member, and means concentrically disposed about said race member for guiding and retaining said rollers about said race member between said flanges comprising a one-piece bearing cage comprising a plurality of annularly disposed axially extending webs circumferentially separating a plurality of pockets alternately opening on opposite axial sides for holding a plurality of rollers, radially disposed rib portions extending transversely on the radially outermost side of said webs and tapering to a feathered edge such that the distance between different ones of said feathered edges on successive ones of said rib portions provides a preselected interference relative to the diametrical dimension of said rollers, said feathered edges being sufficiently deflectable such that each of the plurality of rollers is movable radially inwardly past said feathered edges into said pockets and being sufficiently resilient to return to a position such as to radially retain said rollers, each of said webs and said rib portions associated therewith having an arcuately concave bearing surface individual to one of said plurality of said pockets with alternate ones of said bearing surfaces disposed in face to face relationship on opposite circumferential sides of each of said pockets, said arcuately concave bearing surface being formed as a portion of a circle having a radius substantially equal to the radius of each of the plurality of rollers and having substantially equal contact areas on opposite sides of the mean diameter of said cage whereby the magnitude of the resultant radial force exerted by the rollers on said webs is minimized.

6. A bearing assembly comprising a plurality of rollers, an outer race member having a pair of radially inwardly extending annular flanges axially disposed on either side of said race member, and means concentrically disposed within said race member for guiding and retaining said rollers about said race member between said flanges comprising a one-piece bearing cage comprising a plurality of annularly disposed axially extending webs circumferentially separating a plurality of pockets alternately opening on opposite axial sides for holding a plurality of rollers, radially disposed rib members extending transversely on the radially innermost side of said webs, each of said webs and said rib members associated therewith having an arcuately concave bearing surface individual to one of said plurality of pockets with alternate ones of said bearing surfaces disposed in face to face relationship on opposite circumferential sides of said pockets, said arcuately concave bearing surface being formed as a portion of a circle having a radius substantially equal to the radius of each of the plurality of rollers and having substantially equal contact areas on opposite sides of the mean diameter of said cage whereby the magnitude of the resultant radial force exerted by the rollers on said webs is minimized, each of said rib members being broken away on said concave bearing surface such that the distance at the radially inner extremity between different ones of said rib members on successive ones of said webs provides a preselected interference relative to the diametrical dimension of said rollers such that each of the plurality of rollers can be moved radially outwardly past said rib members into said pockets.

7. In a bearing assembly including a plurality of rollers, a one-piece bearing cage comprising a plurality of annularly disposed axially extending webs circumferentially separating a plurality of pockets, a plurality of connecting portions connecting consecutive pairs of different ones of said web portions at one axial extremity and different consecutive pairs of different ones of said web portions at the opposite axial extremity such that said plurality of pockets alternately open on opposite axial sides, radially disposed rib portions extending transversely on the radially outermost side of said webs and tapering to a feathered edge such that the distance between different ones of said feathered edges on successive ones of said rib portions provides a preselected interference relative to the diametrical dimension of the rollers, said feathered edges being sufficiently deflectable such that each of the plurality of rollers is movable radially inwardly past said feathered edges into said pockets and being sufficiently resilient to return to a position such as to radially retain the rollers, radially disposed rib members extending transversely on the radially innermost side of said webs, each of said webs, with those of said rib portions and said rib members associated therewith, having an arcuately concave bearing surface individual to one of said plurality of pockets with alternate ones of said bearing surfaces disposed in face-to-face relationship on opposite circumferential sides of said pockets, said arcuately concave bearing surface being formed as a portion of a circle having a radius substantially equal to the radius of each of the plurality of rollers and having substantially equal contact areas on opposite sides of the mean diameter of said cage whereby the magnitude of the resultant radial force exerted by the rollers on said webs is minimized, each of said rib members being broken away on said concave bearing surface such that the distance at the radially inner extremity between different ones of said rib members on successive ones of said webs provides a preselected interference relative to the diametrical dimension of the rollers such that each of the plurality of rollers can be moved radially outwardly past said rib members into said pockets, said connecting portions on each side of said cage having a circumferential groove therein, and an annular ring member disposed in said each groove for radially restraining said bearing cage.

(References on following page)

References Cited in the file of this patent

UNITED STATES PATENTS

| | | |
|---|---|---|
| 2,035,417 | Allendorff | Mar. 24, 1936 |
| 2,742,332 | Cobb | Apr. 17, 1956 |
| 2,819,129 | Slick | Jan. 7, 1958 |

FOREIGN PATENTS

| | | |
|---|---|---|
| 993,520 | France | July 25, 1951 |
| 1,143,860 | France | Apr. 15, 1957 |
| 1,198,221 | France | June 8, 1959 |
| 1,238,139 | France | June 27, 1960 |
| 660,399 | Great Britain | Nov. 7, 1951 |
| 804,709 | Great Britain | Nov. 19, 1958 |
| 170,395 | Sweden | Feb. 16, 1960 |

(U.S. corresponding Patent 2,946,663 ____ July 26, 1960)